United States Patent
Fox Davies

(10) Patent No.: US 8,392,325 B2
(45) Date of Patent: Mar. 5, 2013

(54) METHOD AND SYSTEM FOR TAGGING AND TRACKING DONATION TRANSACTIONS

(75) Inventor: Richard Charles Fox Davies, London (GB)

(73) Assignee: Interum Limited, Gibraltar (GI)

( * ) Notice: Subject to any disclaimer, the term of this patent is extended or adjusted under 35 U.S.C. 154(b) by 326 days.

(21) Appl. No.: 12/472,143

(22) Filed: May 26, 2009

(65) Prior Publication Data

US 2010/0306086 A1 Dec. 2, 2010

(51) Int. Cl.
*G06Q 40/00* (2012.01)

(52) U.S. Cl. ............... 705/39; 705/30; 705/35; 705/40; 705/329; 235/380; 707/999.102

(58) Field of Classification Search ............ 705/30, 705/35, 39, 40
See application file for complete search history.

(56) References Cited

U.S. PATENT DOCUMENTS

| | | | |
|---|---|---|---|
| 2002/0174063 A1* | 11/2002 | Major | 705/40 |
| 2006/0195398 A1* | 8/2006 | Dheer et al. | 705/40 |
| 2006/0200426 A1* | 9/2006 | Baker et al. | 705/64 |
| 2006/0212390 A1* | 9/2006 | Gruber | 705/40 |
| 2008/0033855 A1* | 2/2008 | Baker et al. | 705/35 |
| 2009/0192873 A1* | 7/2009 | Marble | 705/39 |
| 2009/0204628 A1* | 8/2009 | Bhogal et al. | 707/102 |
| 2009/0254426 A1* | 10/2009 | Rodriguez et al. | 705/14 |
| 2009/0283587 A1* | 11/2009 | DiBello | 235/380 |
| 2010/0106663 A1* | 4/2010 | Hoang | 705/329 |

* cited by examiner

*Primary Examiner* — Ryan Zeender
*Assistant Examiner* — Hunter Wilder
(74) *Attorney, Agent, or Firm* — Workman Nydegger

(57) ABSTRACT

Method and system for tagging and tracking donation transactions through accounting means between financial and non-financial entities, method comprising steps of accepting registration of one or more users to the System, accepting a donation transaction via Collection Point, capturing data related to the circumstances, type and quantum of a donation transaction, generating a Tracking Reference upon completion of the donation transaction, delivering a receipt for the donation transaction, in which is embedded the tracking reference for the associated donation, tracking the progress of the donation transaction between financial and non-financial entities by means of the interlinked transmission and receipt of reports, accepting inquiries as to the status or history of the donation transactions by reference to a cited tracking reference, accepting inquiries as to the status or history or delivery of the associated donation value by reference to a cited tracking reference and delivering reports in response to such inquiries.

20 Claims, 4 Drawing Sheets

FIGURE 1 : COLLECTION AGENT (100)
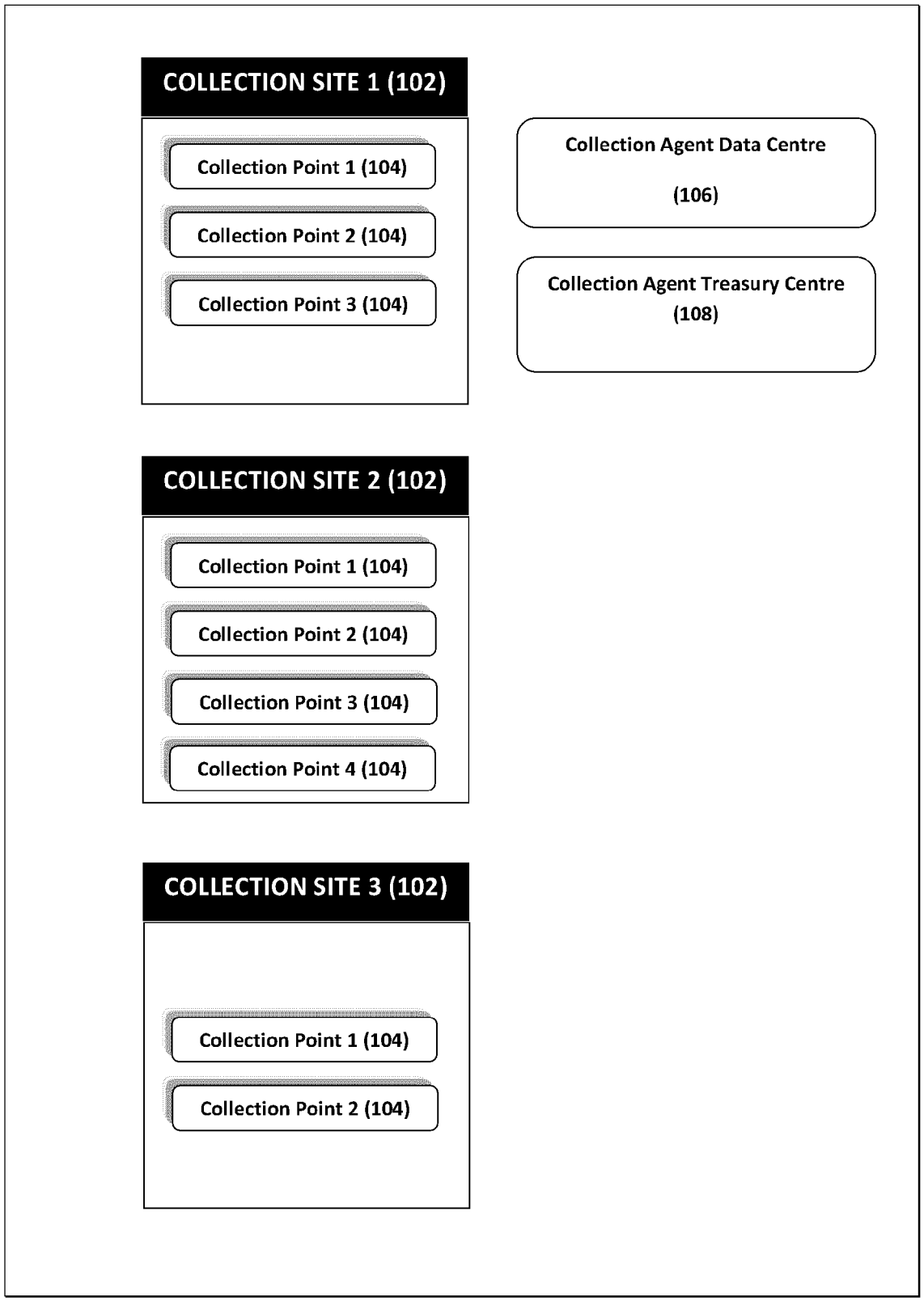

FIGURE 2 : MEANS WITHIN THE COLLECTION POINT (104)
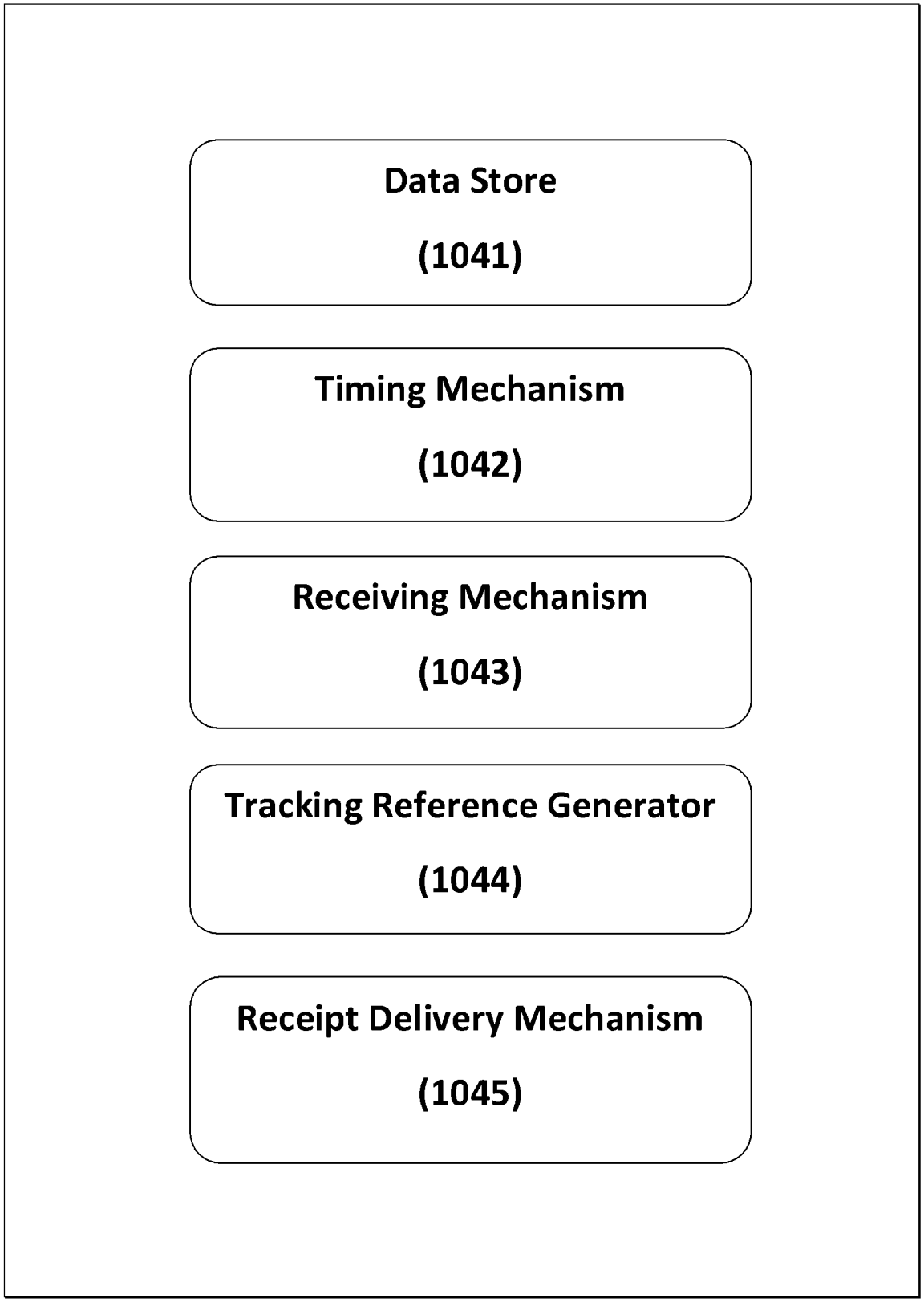

FIGURE 3 : NEW USER REGISTRATION FLOW CHART (300)
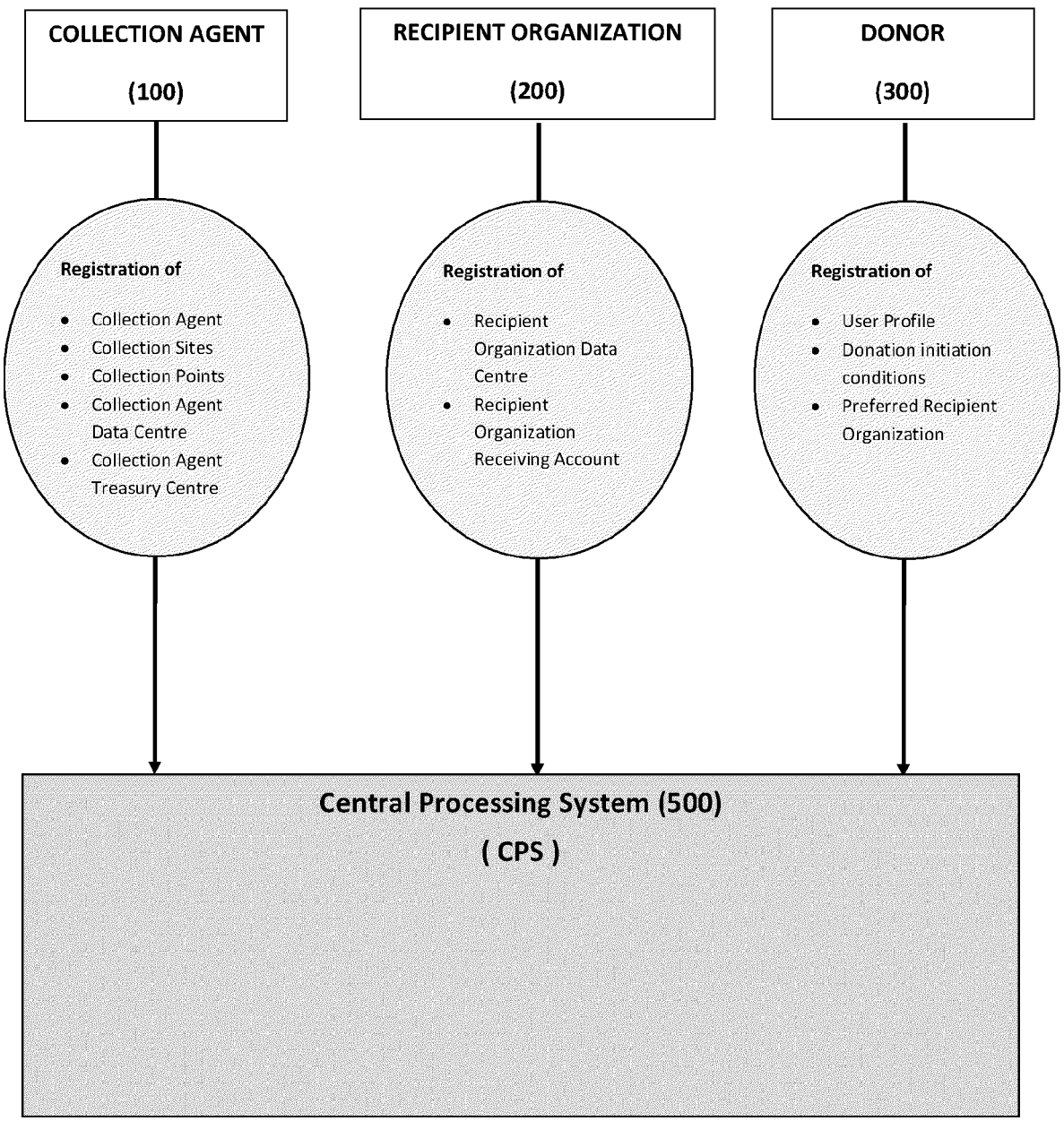

FIGURE 4: SYSTEM ARRANGEMENT (400)
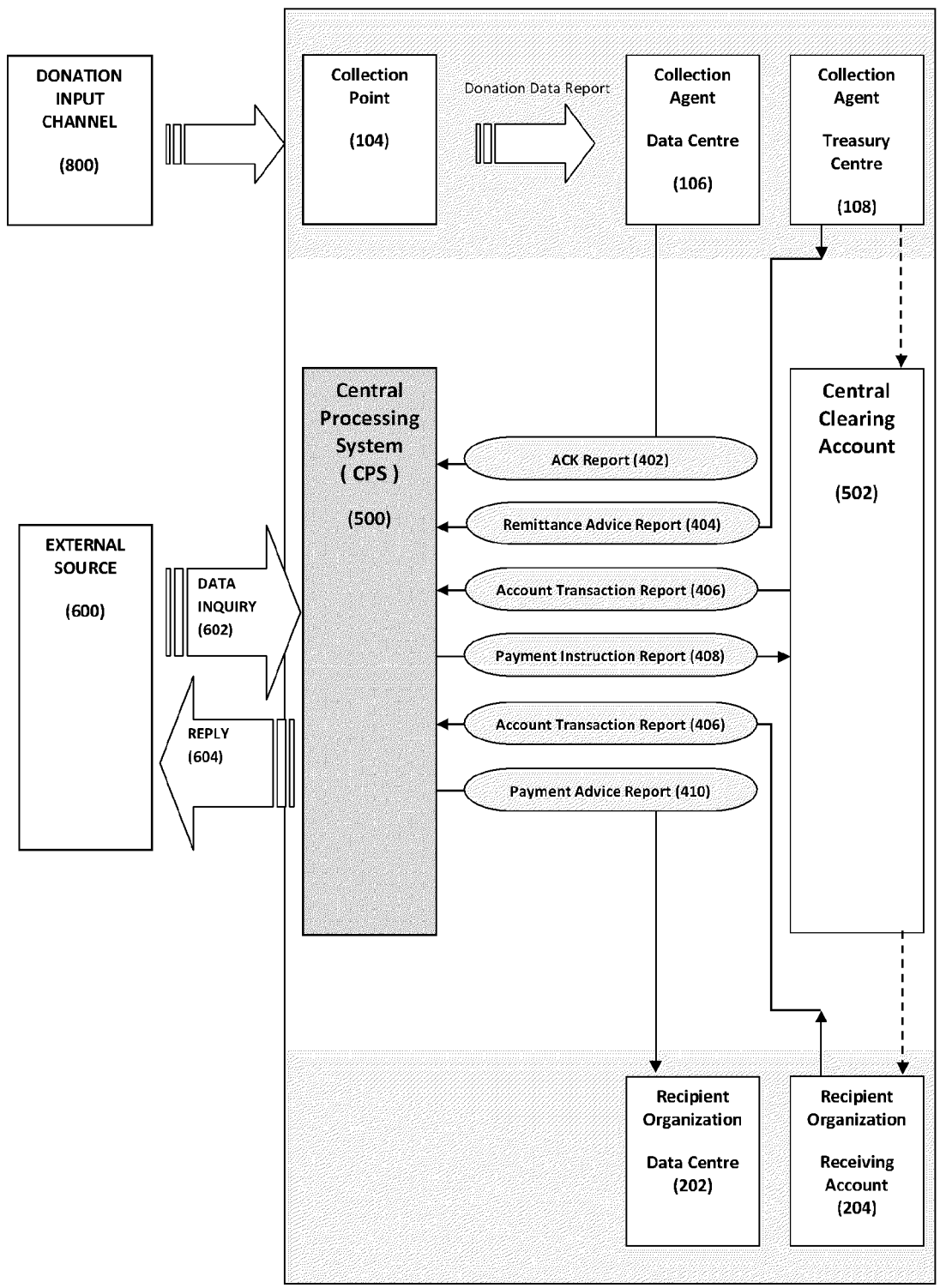

METHOD AND SYSTEM FOR TAGGING AND TRACKING DONATION TRANSACTIONS

FIELD OF INVENTION

The present invention relates to a method and system for tagging and tracking the progress of donation transactions through accounting means between financial and non-financial institutions as donor benefiting organizations to confirm process and delivery.

BACKGROUND ART

Charitable donations are made in many different ways, and in many different amounts. When the quantum is large, it is cost effective to submit the donation as a single transaction. It is then relatively simple for both the donor and the recipient to record the sending and receiving of the donation, and be satisfied as to the safe transmission and delivery of the donation.

Every year, however, many millions of small value donations are made, some involving the giving of a single coin or some loose change. Typically, these smaller donations are collected together—perhaps in a collecting tin—and aggregated by the collector before being forwarded to the recipient. Sometimes there are multiple layers of aggregation. Separate donations of individual coins may go into a tin. The contents of several collecting tins may be merged. Proceeds from various collectors over various days may be aggregated into a single banking account. By this stage, it is impossible for an individual donor to know whether the single coin he or she donated has truly been included in the total sum forwarded to the charity. Similarly, the charity has no way of knowing what they should expect to receive into their bank account in respect of all the individual donations.

Various systems, including online internet based systems, exist for receiving small donations. Some provided a limited form of acknowledgement of receipt or notice of delivery. At present, however, no system affords the donor or charity or other interested party the means to separately identify each individual donation within an aggregation of multiple donations, and to track its process and delivery.

In present times, most donations—including those of relatively small value—are made electronically. Even where the initial donation is made in cash, it is often made in a way or at a location where the details can cost-effectively be recorded electronically: as where small change received back from a retail transaction may be donated into a charity box located on the counter. In such a situation, it is feasible for the donation to be part of the overall retail transaction, with the shopper deciding to donate the one or two coins that might otherwise have been returned in change directly to charity via the electronic cash register.

The concept of assigning letters and parcels a unique tracking reference, so that their passage can be tracked and their final delivery can be confirmed, is well established.

The present invention of which this application is the subject sets out to apply similar principles and concepts, suitably modified, so that each individual donation—no matter how small—can be uniquely referenced and tracked: and the final delivery of each donation to the intended recipient can be shown and proved.

It would not be cost effective to process each small donation through the necessary banking or other accounting processes individually. Nor would it be cost effective for a charity to manually receipt each individual small donation. Thus the present invention seeks to build on the tangentially relevant art of tracking physical parcels and letters, such that a tracking method may also be effected for non-physical intangible items, of which charitable donations are one example.

Charitable donations are transacted in various ways. Small change is given at the counter in shops and coffee houses. Credit and debit card transactions are made at banks or over internet websites. Specialist payment systems such as Pay Pal are used. Calls are solicited to specialist premium rate phone lines and SMS numbers. In all these methods, the small individual amounts of donations are aggregated before being received by the charity and there is no convenient and secure way to determine that every donation collected in has actually been delivered.

The desired transparency and accountability that the present system achieves beyond that offered by any background art is achieved by the use and communication of a series of cross-referenced reports published either via the Internet or by other means. The inclusion of universally unique tracking reference allocated to each donation transaction allows the progress of each individual donation to be tracked and verified through each and every stage of each donation's progress towards final delivery.

Whilst a major application of the present invention relates to charitable donations of financial value, the subject matter claimed herein is not limited to embodiments that solve any disadvantages or that operate only in environments such as those described above. Rather, the present invention may find application for the tagging and tracking of a wide variety of intangible items, whether of financial value or not, and whether for charitable purposes or not, and this background is only provided to illustrate one exemplary technology area where some embodiments described herein can be practiced.

SUMMARY OF INVENTION

The invention is directed towards a methodology and system for generating unique reference identifiers for donation transactions, such that the donation transactions may be tagged and tracked through all necessary processes as it progresses from the initiation of the transaction through to the final delivery of the donation or equivalent intangible item.

The methodology and system provides for enquiries to be submitted to the system at any time as to the present status, nature and history of any cited donation transaction, and for the system to return an appropriate report.

In the preferred embodiment is an arrangement comprising the steps of registering a new user to the system (where the new user may be a Collection Agent a Recipient Organization or a Donor) activating a Donation Input Channel such that the system becomes aware of the donation transaction, receiving data describing the donation transaction at a Collection Point, generating a unique tracking reference; delivering a receipt, transmitting to various parties involved in the processing and delivery of the donations transaction data describing the donation transaction by reference to interlinked and cross-referenced reports, receiving from various parties involved in the processing and delivery of the donations transaction data describing the donation transaction by reference to interlinked and cross-referenced reports, receiving enquiries as to the status or nature or history of any cited donations, and delivering reports as to the status or nature or history of any cited donations.

The present invention consists of features and a combination of parts hereinafter fully described and illustrated in the accompanying drawings. It is to be understood that variations in the details may be made without departing from the scope of the invention of sacrificing any of the advantages of the present invention.

BRIEF DESCRIPTION OF ACCOMPANYING DRAWINGS

To further clarify various aspects of some embodiments of the present invention, a more particular description of the invention will be rendered by references to specific embodiments thereof, which are illustrated in the accompanying drawings. It is appreciated that these drawings depict only typical embodiments of the invention and are therefore not to be considered limiting of its scope. The invention will be described and explained with additional specificity and detail through the accompanying drawings in which:

FIG. 1 is a schematic diagram of the component elements within the ambit of a Collection Agent.

FIG. 2 is a schematic diagram of the means comprised within a Collection Point.

FIG. 3 is a flow chart identify the component data element submitted in New User Registration.

FIG. 4 is a diagrammatic flow chart of the overall System Arrangement.

DETAILED DESCRIPTION OF THE PREFERRED EMBODIMENTS

The present invention relates to a method for recording individual donations of money, monetary value or other intangible items of value made at disparate Collection Points (104); recording the quantum and other data describing the individual donation; associating each individual donation with a unique identifying reference; and providing means open to any person for tracking such individual donation as it progresses through the necessary banking and accounting processes until it is finally delivered into the control of the intended recipient.

Hereinafter, this specification will describe the present invention according to the preferred embodiments. It is to be understood that limiting the description to the preferred embodiments of the invention is merely to facilitate discussion of the present invention and it is envisioned that other embodiments may be produced without departing from the scope of the appended claims.

Reference is first being made to FIG. 1.

FIG. 1 illustrates the structure and component parts of a Collection Agent (100).

A Collection Agent (100) is a user of the method, including the necessary technical components. In a typical embodiment of the proposed invention, but cited here as an example only to aid clarity and understanding, the Collection Agent (100) may be a coffee house chain such as Starbucks or San Fran Cisco Coffee. In other embodiments, the Collection Agent (100) may be a telecommunications operator accepting donations via premium rate phone lines or SMS (Short Message Systems) or the Collection Agent (100) may be the owner of an internet website or bank accepting donations made by credit or debit card.

Within the ambit of the Collection Agent (100) are one or more Collection Sites (102). Each Collection Site (102) is a separate physical or virtual location operating within the ambit of the Collection Agent (100). Thus in the coffee house example, each separate physical store of the coffee house chain may be a separate Collection Site (102). In the phone line or SMS example, each telephone number to be dialed or SMS number to be addressed constitutes a separate Collection Site (102) within the ambit of the relevant telecommunications operator. Where the Collection Agent (100) is an internet website operator, each Internet URL within the ambit of the website operator may be a separate Collection Site (102).

Finally, within any Collection Site (102) may be one or more Collection Points (104).

A Collection Point (104) is a physical device or electronic circuit (according to the nature of the Collection Site (102)) capable of receiving a donation or processing a donation transaction, capturing data related to the circumstances and type and quantum of the donation transaction; generating a unique tracking reference, issuing a receipt to the Donor (300), and reporting details of the donation to the Collection Agent Data Centre (106).

In the coffee house example, the Collection Point (104) may be one or more physical point-of-sale terminals or cash registers. In the telecommunications example, the Collection Point (104) may be the particular electronic device or logical circuit that processes the incoming telephone call or SMS. In the example of the internet website acceptance of a credit or debit card transaction, the Collection Point (104) may be the particular software or support mechanism that processes the card transaction to apply for transaction approval from the relevant financial institution.

Consequently, each Collection Agent (100) has within its ambit one or more Collection Sites (102) within each of which functions one or more Collection Points (104).

Further, within the ambit of each Collection Agent (100) there is a Collection Agent Data Centre (106) and a Collection Agent Treasury Centre (108) Within the Collection Agent Data Centre (106) are means (typically a communicating computer device) to receive data directly or indirectly from Collection Points (104) operating within the ambit of the relevant Collection Agent (100); means to process the data; and means to communicate data onward to the Collection Agent Treasury Centre (108) and to other systems outside the ambit of the Collection Agent (100), including to the Central Processing System (500) as detailed later in this description.

The Collection Agent Treasury Centre (108) is a facility with means to receive data from the Collection Agent Data Centre (106); and to transmit data onward to other systems outside the ambit of the Collection Agent (100).

In any of the examples above, where the donations are of financial nature, the Collection Agent Data Centre (106) may be a standard communicating computing device; and the Collection Agent Treasury Centre (108) may be the same or a different communicating computing device, but with authority to initiate financial payments from the Collection Agent (100) (or some entity, such a bank, which is capable of make payments on the Collection Agents (100) behalf) to an external bank account or entity that is outside the ambit of the Collection Agent (100).

In other embodiments, where the donations are of intangible items of a non-financial nature (such as transferable frequent flier benefits that are designated to offer benefit but are deemed to have no redeemable financial value) the Collection Agent Treasury Centre (108) may be a standard communicating computer device with authority to initiate transfers of credits or other non-tangible representations of the donation to an external account or entity that is outside the ambit of the Collection Agent (100).

The Collection Agent Data Centre (106) processes and communicates data of no immediate convertible value (whether financial or otherwise). The Collection Agent Treasury Centre (108) processes and authorizes the transfer of the value or other benefit (whether financial or otherwise) associated with the quantum of the donation.

Reference is now made to FIG. 2.

In the preferred embodiment, within each Collection Point (104) is provided a Data Store (1041); a Timing Mechanism (1042); a Receiving Mechanism (1043); a Tracking Reference Generator (1044) and a Receipt Delivery Mechanism (1045).

Within the method that is the subject of the present invention, each Collection Agent (100) is registered to a Central Processing System (500) (detailed later in FIG. 4) with a unique Collection Agent (100) (CA) identifier. Within the Data Store (1041) is recorded the value of the Collection Agent (100) (CA) identifier within whose ambit the Collection Point (104) is operating.

Further, within the method that is the subject of the present invention, each Collection Site (102) that is to be operated with the ambit of any given Collection Agent (100) is registered to the same Central Processing System (500) with a Collection Site (102) (CS) identifier that is a unique Collection Site (102) (CS) identifier within all the Collection Sites (102) operating with the ambit of the relevant Collection Agent (100).

Further, within the method that is the subject of the present invention, each Collection Point (104) that is to be operated with the ambit of any given Collection Site (102) is registered to the same Central Processing System (500) with a Collection Point (104) (CP) identifier that is a unique Collection Site (102) (CP) identifier within all the Collection Points (104) operating with the ambit of the relevant Collection Site (102).

Within the Data Store (1041) within any given Collection Point (104) are recorded the Collection Agent (100) and Collection Site (102) and Collection Point (104) values that have been registered to the Central Processing System (500) for the given Collection Point (104), the concatenation of which three items of data (CA+CS+CP) provides the Collection Point (104) with a unique reference that is capable of being received, processed and interpreted by the remote Central Processing System (500).

Further, in the preferred embodiment, within the Collection Point (104) are means for a Timing Mechanism (1042) sufficient to provide the Collection Point (104) with data representing the present date and time. In an alternative arrangement, the Collection Point (104) may simply have access to an external Timing Mechanism (1042) providing it with data representing the present date and time.

Further, within the Collection Point (104) are provided means for a Receiving Mechanism (1043), sufficient to receive data describing the circumstances and method and type and quantum of a donation transaction. In the coffee house example mentioned above, the Receiving Mechanism (1043) may consist of particular keys on a point-of-sale terminal, operating in association with other data input related to a sale of goods or services, together with computer code and facilities within the terminal, that together record and store data describing the circumstances and method and type and quantum of a donation transaction. In the premium rate telephone line or SMS example, or in other examples mentioned above, the Receiving Mechanism (1043) may consist solely of appropriate computer code within the Collection Point (104), sufficient to record data describing the circumstances and method and type and quantum of a donation transaction.

Further, within the Collection Point (104) are provided means for a Tracking Reference Generator (1044). Although non-electronic implementations of the Tracking Reference Generator (1044) may be envisioned, in the preferred embodiment the means may consist substantially of a conventional micro-processor device. The function of the Tracking Reference Generator (1044) is to append the data representing the present date and time to the concatenated CA+CS+CP string held available for it in the Data Store (1041) in order to create a long-form Tracking Reference designated in base 10 notation. In a preferred embodiment, the Tracking Reference Generator (1044) may optionally have means to convert such long-form tracking reference into a short or shorter-form tracking reference by translating the base 10 notation into base 32 notation or notation of some other preferred base notation.

Further, within the Collection Point (104) are means for a Receipt Delivery Mechanism (1045). Working jointly, the Receiving Mechanism (1043) and Tracking Reference Generator (1044) are competent to generate a receipt for the donation, within which is some or all of the data captured by the Receiving Mechanism (1043) together with the output from the Tracking Reference Generator (1044).

The data is then delivered back to the Donor (300) by the Receipt Delivery Mechanism (1045)

In the coffee example described above, the Receipt Delivery Mechanism (1045) may be the conventional till roll and conventional receipt printer attached to the point-of-sale terminal.

In the telephone example described above, the Receipt Delivery Mechanism (1045) may be circuitry provided with speech synthesis software capable of speaking the receipt data to the Donor (300) on the phone.

In the SMS example, the Receipt Delivery Mechanism (1045) may be an automatic SMS generator capable of generating and transmitting the receipt data to the mobile phone or other SMS enabled device from which the donation was received.

Reference is now made to FIG. 3

FIG. 3 shows the processes for the necessary registration of new users onto the Central Processing System (500) of the present invention, prior to their use of the invention.

Within the overall Registration of New Users, a new user may be a Collection Agent (100), a Recipient Organization (200), or a Registered Donor (300).

Where the new user is a Collection Agent (100), the user is required to register to the Central Processing System (500) data sufficient to identify the Collection Agent (100), each Collection Site (102) which is to be operated within the ambit of the Collection Agent (100), and each Collection Point (104) that is to be operated at each of those Collection Sites (102) within the ambit of the Collection Agent (100). Further, the user is required to register data concerning Collection Agent Data Centre (106) and the Collection Agent Treasury Centre (108) sufficient for the Central Processing System (500) to validate the source of data transmitted to it by the Collection Agent Data Centre (106) and the Collection Agent Treasury Centre (108).

Where the new user is a Recipient Organization (200), the user is required to register to the Central Processing System (500) data sufficient to identify the Recipient Organization (200), and to identify the data receiving address to which the Central Processing System (500) may transmit data intended to be received by the Recipient Organization Data Centre (202), and to identify the details concerning the Recipient Organization Receiving Account (204) that are to be cited in any Payment Instruction Report (408) intended to initiate a transfer of donations to the Recipient Organization (200).

It is a system requirement that such Recipient Organization Receiving Account (204) is capable of generating verifiable periodic automatic Account Transaction Reports (406), copies of which may automatically be transmitted to and received and interpreted by the Central Processing System (500). Typically, therefore, the receiving account may be an account maintained with a recognized banking institution that offers automatic electronic delivery of account statements.

Upon registration to the Central Processing System (500), the new user Recipient Organization (200) is allocated a unique identifier which may be made known to Collection Agents (100) registered to the system, and other components of the invention (including Collection Points (104)) such that when a Donation is first made the identifier of the intended Recipient Organization (200) may be associated with the other data recorded by the Receiving Mechanism (1043) with respect to the Donation.

A Donor (300) wishing to initiate a donation transaction does not need to be registered to the system. An unregistered Donor (300) may satisfactorily initiate a donation transaction via a Collection Point (104) and be issued with a Tracking Reference, which Tracking Reference may be cited by the Donor (300) or by any person making a Data Inquiry (602) of the Central Processing System (500) via an External Source (600).

There are, however, certain features of the invention for which registration is essential.

A Donor (300) may be a corporate entity wishing to effect donation transactions upon the instance of some other event initiated by a third party. An example of this would be "cause related marketing" where a product manufacturer or service provider wishes to effect a donation transaction (such as making a donation to a designated recipient organization) upon the event of consumer purchase an example of that entity's product or service. As an example, a water seller may commit to contribute a sum of money to a water related charity in respect of each bottle of the product purchased within a certain period. The Donor (300) in this scenario is the corporate entity. The entity must register itself to the Central Processing System (500), together with a profile giving details of the circumstances under which it wishes to initiate any donation transaction, and the quantum of such donation transactions. When a Collection Point (104) captures an instance of transaction data matching the profile, and that data is transmitted onward to the Collection Agent Data Centre (106) and thence onward to the Central Processing System (500), that instance of transaction data can be interpreted and recorded within the system generally as a donation by the said entity Other additional features available to a registered user as opposed to an unregistered user include (but are not limited to) that the registered user is able to request for the system to proactively send notification of the donation transaction progress to the Donor (300). The Donor (300) does then not need to make repeated enquiries of the system to track the progress of the donation transaction. In addition, the Donor (300) can request a feedback on the progress of any particular project regardless of whether they have or have not previously made a donation to that particular project. The Donor (300) can relate one or more alternate donation channels against a single account. For example, over a period of time a single Donor (300) may make donations through credit card, by SMS or by making cash donations at points of sale. The entire set of donation transactions can be consolidated into a single account by registering for an account with the Central Processing System (500) and by proving the connections between the various donations channels and the Donor's identity.

Where a new user is a Donor (300) wishing to be registered to the Central Processing System (500), the user is required to register data sufficient to identify the Donor (300), together with data sufficient to allow the Central Processing System (500) to address data transmissions to the Donor (300). Such data may include (but is not limited to) email addresses, telephone numbers, and SMS numbers. Additionally, the user may optionally register to the system any selection of preferences or additional personal data as the donor may wish to share with the system, and the system operator may consider useful to store and use.

FIG. 4 is a flowchart illustrating a method for tagging and tracking donation transactions of the present invention.

The System Arrangement (400) for tagging and tracking donations transactions comprises an Input Channel (800) for a donation, at least one or more Collection Points (104) in communication with at least one or more Collection Agents (100) registered as users of the system; which Collection Agents (100) are in communication with the Central Processing System (500). Further, the System Arrangement (400) comprises a Central Clearing Account (502) and one or more Recipient Organization Receiving Accounts (204) and one or more Recipient Organization Data Centre (202).

The particular nature of the Donation Input Channel (800) may vary according to the manner in which the donation transaction is initiated. In a preferred embodiment, where the donation transaction is in an intangible electronic form, which type may include electronic payment of money, the Donation Input Channel (800) may be an electronic circuit. In an alternative embodiment, where the donation item is physical currency, the Donation Input Channel (800) may be a coin or note acceptor. In another embodiment, where the donation is related to the fulfillment of a cause related marketing commitment, the Donation Input Channel (800) may be an electronic recognition of an event specified within the cause related marketing program, such as the download of a file from the internet.

Regardless of the particular embodiment of the Donation Input Channel (800), an appropriate event at or within the Donation Input Channel (800) presents the Collection Point (104) with data describing the donation and its context.

Each Collection Point (104) comprises a Data Store (1041) wherein is recorded a unique identifier in the format CA+CS+CP where CA identifies the Collection Agent (100) within whose ambit the Collection Point (104) operates and CS identifies the Collection Site (102), being a specific physical or virtual location at which the Collection Point (104) is operated and CP identifies the specific item of physical hardware or electronic circuitry in which the Collection Point (104) functionality is embodied.

Each Collection Point (104) further comprises a Timing Mechanism (1042) by which the Collection Point (104) may determine the present date and time;

Each Collection Point (104) further comprises a Receiving Mechanism (1043), such that the donation may be received and data describing the donation (including, but not limited to, the amount of the donation and the intended recipient) may be received into the Collection Point (104).

Each Collection Point (104) further comprises a Tracking Reference Generator (1044), most conveniently embodied within an electronic micro-processor unit, whereby the combination of data held in the Data Store (1041) concatenated together with the data representing the present date and time as derived from the Timing Mechanism (1042) may be processed to generate a unique tracking reference to be associated with the relevant donation.

Each Collection Point (104) further comprises a Receipt Delivery Mechanism (1045) by which a receipt for the donation, in which is included notification of the relevant unique tracking reference, may be delivered to the Donor (300).

Each Collection Point (104) has means by which to communicate donation data reports to a relevant Data Centre (106) operated by the Collection Agent (100).

Each Collection Agent (100) has means by which to communicate periodically from its relevant Data Centre (106) to the Central Processing System (500) in order to deliver reports (ACK Reports) (402), which reports detail all donations received by all Collection Points (104) operating within the ambit of the particular Collection Agent (100) that have not previously been reported. Each ACK Report (402) details, for each included donation, the unique tracking reference and the amount of the donation and the intended recipient, together with such other data as the Collection Agent (100) may wish to disclose.

The Central Processing System (500) has means by which to receive any ACK Report (402) submitted to it by any Collection Agent Data Centre (106) together with means by which to extract the included data and store it within data tables held within the Central Processing System (500).

Thus the Central Processing System (500) at this stage holds a separate data record of each donation that has been reported to it, which record includes (but is not necessarily limited to) data showing the unique tracking reference associated with the donation, the time and Collection Point (104) at which the donation was made, the value of the donation made, and the intended recipient of the donation.

The Central Processing System (500) further has means to accept a Data Inquiry (602) from any External Source (600) (such a terminal connected to the internet) as to the known status and history of any specific donation or set of donations, as referenced by the relevant unique tracking reference or references; together with means to generate and transmit back a Reply (604).

The Central Processing System (500) may therefore at this stage report that the receipt of a specific donation has been acknowledged (in the ACK Report) (402) by the Collection Agent (100), notwithstanding that no moneys have as yet been remitted by the Collection Agent (100).

Each Collection Agent (100) has a Collection Agent Treasury Centre (108) which receives the donations moneys (whether in cash or electronically or in any other form) from the Collection Points (104) operating within its ambit. The Collection Agent Treasury Centre (108) has means to calculate the total value of donations that have been received from or through its relevant Collection Points (104) but which have not as yet been remitted to the Central Clearing Account (502) of the System.

The Collection Agent (100) has means by which to communicate periodically from its Treasury Centre (108) to the Central Processing System (500) a Remittance Advice Report (404) detailing all ACK Reports (402) for which remittance has not yet been made by the Collection Agent (100) to the Central Clearing Account (502): such Remittance Advice Report (404) detailing not only a listing of each relevant ACK Report (402), but also the sum total of all donations represented by those ACK reports (402), for which remittance has not yet been made, and a report identifier sufficient to uniquely identity the Remittance Advice Report (404).

The Central Processing System (500) has means to receive any such Remittance Advice Report (404) submitted to it by any Collection Agent Treasury Centre (108), together with means by which to extract the included data and store it within data tables held within the Central Processing System (500), and means to relate and cross-reference data extracted from both ACK Reports (402) and Remittance Advice Reports (404).

The Central Processing System (500) may therefore at this stage accept any Data Inquiry (602) from an External Source (600) as to the known status and history of any specific donation or set of donations, as referenced by the relevant unique tracking reference or references, and the Central Processing System (500) may generate and transmit back a Reply (604) to the External Source (600) data to indicate that a Remittance Advice Report (404) has been received from the relevant Collection Agent (100) in respect of the specific donation or donations that are the subject of the inquiry.

The Collection Agent Treasury Centre (108) has means for remitting to the Central Clearing Account (502) a settlement of the donation values, together with data identifying a transaction reference identical to the Remittance Advice Report (404) identifier previous notified to the Central Processing System (500)

The Central Clearing Account (502) has means by which to generate and submit to the Central Processing System (500) an Account Transaction Report (406), including data recording the settlements received from any Collection Agent Treasury Centre (108), which report identifies the amount of each settlement received together with the relevant transaction reference.

The Central Processing System (500) has means to receive such Account Transaction Report (406) submitted to it from the Central Clearing Account (502) together with means by which to extract the included data and store it within data tables held within the Central Processing System (500).

The Central Processing System (500) may therefore at this stage accept any Data Inquiry (602) from an External Source (600) as to the known status and history of any specific donation or set of donations, as referenced by the relevant unique tracking reference or references, and the Central Processing System (500) may generate and transmit back a Reply (604) to the External Source (600) data to indicate that an Account Transaction Report (406) has been received from the Central Clearing Account (502) indicating receipt of the relevant remittance into the Central Clearing Account (502) in respect of the specific donation or donations that are the subject of the inquiry.

The Central Processing System (500) has means to analyze the data submitted in and extracted from any ACK Report (402), such as to ascertain the total of donations intended for each nominated Recipient Organization (200)

The Central Processing System (500) further has means to prepare a Payment Advice Report (410), in respect of each Recipient Organization Data Centre (202), detailing a history of the Account Transaction Reports (406) received by the Central Processing System (500) from the Central Clearing Account (502) since the last previous Payment Advice (410) report was submitted by the Central Processing System (500) to that Recipient Organization Data Centre (202). The Central Processing System (500) has means by which to generate and to embed within the report a unique Payment Instruction reference identifier. The Central Processing System (500) further has means to transmit such Payment Advice Report (410) to the Recipient Organization Data Centre (202).

The Central Processing System (500) has means by which to generate and transmit to the Central Clearing Account (502) a Payment Instruction Report (408) detailing the settlements to be made to each Recipient Organizations' Receiving Account (204), and instructions and authority in data form to make such settlements, together with the relevant Payment Instruction reference identifier.

The Central Processing System (500) may therefore at this stage accept any Data Inquiry (602) from an External Source (600) as to the known status and history of any specific donation or set of donations, as referenced by the relevant unique tracking reference or references, and the Central Processing System (500) may generate and transmit back a Reply (604) to the External Source (600) data to indicate that in respect of the specific donation or set of donation that are the subject of the inquiry a Payment Advice Report (410) has been generated and transmitted to the Recipient Organization Data Centre (202) and a Payment Instruction Report (408) has been generated and transmitted to the Central Clearing Account (502) both of which reports may be analyzed. This is notwithstanding that no indication may be given as to whether any relevant payment has yet been made from the Central Clearing Account (502) to the relevant Recipient Organization Receiving Account (204).

The Central Clearing Account (502) has means to effect a transfer to the Recipient Organization Receiving Account (204) of payment of the relevant amount as specified in the relevant Payment Instruction Report (408), together with data representing the relevant Payment Instruction Identifier.

The Recipient Organization Receiving Account (204) has means by which to generate and submit to the Central Processing System (500) an Account Transaction Report (406), which report identifies the amount of each payment received from the Central Clearing Account (502) together with the Payment Instruction identifier.

The Central Processing System (500) has means to receive such Account Transaction Report (406) submitted to it from the Recipient Organization Receiving Account (204) together with means by which to extract the included data and store it within data tables held within the Central Processing System (500).

The Central Processing System (500) may therefore at this stage accept any Data Inquiry (602) from an External Source (600) as to the known status and history of any specific donation or set of donations, as referenced by the relevant unique tracking reference or references, and the Central Processing System (500) may generate and transmit back a Reply (604) to the External Source (600) data to indicate that in respect of the specific donation or set of donation that are the subject of the inquiry an Account Transaction Report (406) has been generated by and transmitted from the Recipient Organization Receiving Account (204) and duly received by the Central Processing System (500) indicating that payment into the Recipient Organization Receiving Account (204) has been properly effected in respect of the donation or set of donations that are the subject of the inquiry.

The present invention may be embodied in other specific forms without departing from its essential characteristics. The described embodiments are to be considered in all respects only as illustrative and not restrictive. The scope of the invention is, therefore indicated by the appended claims rather than by the foregoing description. All changes, which come within the meaning and range of equivalency of the claims, are to be embraced within their scope.

The invention claimed is:

1. A computer-implemented method for tagging and tracking the progress of donation transactions involving one or more computer devices at one or more collection points and processed by a central processing system through accounting means between one or more collection agents, one or more central clearing accounts, and one or more recipient organizations, the method comprising the steps of:
   the central processing system accepting registration of the one or more collection agents;
   the central processing system receiving data relating to a plurality of donation transactions at one or more collection points associated with one or more collection sites of the one or more collection agents, including data related to a donation value and intended recipient for each donation transaction;
   the central processing system receiving a unique tracking reference for each donation transaction, the unique tracking reference comprising concatenated data identifying at least a collection agent, a collection site, a collection point, a donation date, a donation time, a donation value, and an intended recipient for the donation transaction;
   the central processing system storing a separate data record for each donation transaction, including the unique tracking reference for each donation transaction;
   the central processing system tracking the progress of the plurality of donation transactions as they are transferred between the one or more collection agents, the one or more central clearing accounts, and the one or more recipient organizations by means of interlinked transmission and receipt of reports, wherein a plurality of donations from at least some of the plurality of donation transactions are aggregated into a common account, but each donation transaction maintains its ability to be tracked and verified by means of the unique tracking reference;
   the central processing system accepting enquiries as to a status or history of at least some of the donation transactions by reference to the unique tracking references for the donation transactions; and
   the central processing system delivering reports in response to such enquiries.

2. The method according to claim 1, wherein the central processing system further receives reports from the one or more collection agents regarding donations made at the one or more collection points associated with the one or more collection agents.

3. The method according to claim 1, further comprising the central processing system accepting registration of one or more recipient organizations, the central processing system associating a donation transaction and its unique tracking reference with an intended recipient organization and transmitting data relating to one or more donations to one or more recipient organization data centers.

4. The method according to claim 1, further comprising the central processing system accepting registration of one or more donors, the central processing system associating a donation transaction and its unique tracking reference with a donor and transmitting data relating to the donation transaction to the donor.

5. The method according to claim 1, wherein the donation transaction is part of a larger transaction involving another transaction besides the donation transaction, and wherein the data received by the central processing system includes data related to the larger transaction.

6. The method according to claim 1, wherein the donation transaction is of a financial nature.

7. The method according to claim 1, wherein the donation transaction is of a non-financial intangible nature.

8. The method according to claim 1, wherein a donation of value is made at a same time and place as the donation transaction.

9. The method according to claim 1, wherein a donation of value is made separately from but consequent upon the donation transaction.

10. The method according to claim 1, wherein at least one of the donation transactions involves an intangible item.

11. The method according to claim 2, wherein each report from the one or more collection agents includes information relating to all donation transactions at all collection points associated with an associated collection agent that have not been previously reported by the collection agent and, for each donation transaction, at least the unique tracking reference for the donation transaction.

12. The method according to claim 1, the plurality of entities comprising at least one collection agent, at least one bank or treasury center, and at least one recipient organization.

13. The method according to claim 12, the central processing system including or communicating with a central clearing account at the at least one bank or treasury center for reconciling donations made by one or more donors with one or more recipient organization receiving accounts at the at least one bank or treasury center into which donated value for one or more corresponding recipient organizations is deposited.

14. The method according to claim 1, the central processing system further identifying and tracking individual donations from within aggregated donation amounts received by one or more collection agents and aggregated donation amounts delivered to one or more recipient organizations.

15. The method according to claim 1, further comprising providing a recipient organization with information relating to an aggregate value of multiple donations made to it by multiple donors.

16. In a computerized donation collection system for tagging and tracking progress of donation transactions involving one or more computer devices at one or more collection points and that are processed by a central processing system through accounting means between one or more collection agents, one or more central clearing accounts, and one or more recipient organizations, a computer-implemented method comprising the steps of:

the computerized system accepting registration of one or more collection agents;

the computerized system capturing or receiving data relating to a plurality of donation transactions via one or more computer devices at one or more collection points associated with one or more collection sites of the one or more collection agents, including data related to a donation value and intended recipient for each donation transaction;

the computerized system generating or receiving a unique tracking reference for each donation transaction, the unique tracking reference comprising concatenated data identifying at least a collection agent, a collection site, a collection point, a donation date, a donation time, a donation value, and an intended recipient for the donation transaction;

the computerized system causing or facilitating delivery of a receipt to a donor of a donation transaction, wherein the receipt includes the unique tracking reference and donation amount for the donation transaction;

the computerized system storing or transmitting a separate data record for each donation transaction, including the unique tracking reference for each donation transaction;

the computerized system tracking the progress of the plurality of donation transactions as they are transferred between the one or more collection agents, the one or more banks central clearing accounts, and the one or more recipient organizations by means of interlinked transmission and receipt of reports, wherein a plurality of donations from at least some of the plurality of donation transactions are aggregated into a common account, but each donation transaction maintains its ability to be tracked and verified by means of the unique tracking reference;

the computerized system accepting enquiries as to a status or history of at least some of the donation transactions by reference to the unique tracking references for the donation transactions; and the computerized system delivering reports in response to such enquiries.

17. The method according to claim 16, wherein the central processing system further receives reports from the one or more collection agents regarding donations made at one or more collection points associated with the one or more collection agent, and wherein each report from the one or more collection agents includes information relating to all donation transactions at all collection points associated with an associated collection agent that have not been previously reported by the collection agent and, for each donation transaction, the unique tracking reference, donation amount, and intended recipient.

18. The method according to claim 16, the central processing system including or communicating with a central clearing account at the at least one bank or treasury center for reconciling donations made by one or more donors with one or more recipient organization receiving accounts at the at least one bank or treasury center into which donated value for one or more corresponding recipient organizations is deposited.

19. At a computerized system for tagging and tracking the progress of donation transactions involving one or more computer devices at one or more collection points and that are processed by a central processing system through accounting means between a plurality of entities, a computer-implemented method comprising the steps of:

a collection agent registering with a central processing system, including registering one or more collection sites associated with the collection agent and one or more collection points associated with each collection site of the collection agent;

the collection agent accepting donations from donors at the one or more collection points associated with the one or more collection sites of the collection agent;

the collection point recording data relating to at least an amount, a donation date, a donation time: and an intended recipient for each donation transaction;

the collection point generating a unique tracking reference for each donation transaction, the unique tracking reference comprising concatenated data identifying at least the collection agent, a collection site, a collection point, the donation date, the donation time, a donation value, and the intended recipient for the donation transaction;

the collection point delivering a receipt to a donor of a donation transaction upon occurrence of a donation transaction and before a donation of value is transferred to an intended recipient associated with the donation transaction, wherein the receipt includes the unique tracking reference and a donation amount for the donation transaction;

the collection agent transmitting a report to the central processing system that includes a plurality of unique tracking references corresponding to a plurality of donation transactions so as to enable the central processing system to:

store a separate data record for each donation transaction, including the unique tracking reference for each donation transaction;

track the progress of the plurality of donation transactions as they are transferred between the collection agent, the one or more central clearing accounts, and the one or more intended recipients of the donations: wherein a plurality of donations from at least some of the plurality of donation transactions are aggregated into a common account, but each donation transaction maintains its ability to be tracked and verified by means of the unique tracking reference;

accept enquiries as to a status or history of at least some of the donation transactions by reference to the unique tracking references for the donation transactions; and deliver reports in response to such enquiries.

20. The method according to claim 19, wherein at least some of the donations are made at the same time and place as the donation transactions and at least some other of the donations are made separately from but consequent upon the donation transactions.

\* \* \* \* \*